United States Patent [19]

Eckstein et al.

[11] Patent Number: 4,620,824
[45] Date of Patent: Nov. 4, 1986

[54] HIGH-SPEED DRIVING ADAPTER FOR BORING, MILLING AND SIMILAR MACHINE TOOLS

[75] Inventors: Rolf Eckstein, Roedental; Siegfried Buhl; Jürgen Krümm, both of Coburg, all of Fed. Rep. of Germany

[73] Assignee: Werkzeugmaschinenfabrik Adolf Waldrich Coburg GmbH & Co., Coburg, Fed. Rep. of Germany

[21] Appl. No.: 689,626

[22] Filed: Jan. 8, 1985

[30] Foreign Application Priority Data

Feb. 1, 1984 [DE] Fed. Rep. of Germany ... 8402787[U]

[51] Int. Cl.⁴ ............................................. B23C 1/00
[52] U.S. Cl. ..................................... 409/233; 408/57; 408/234; 408/124
[58] Field of Search ............... 409/135, 136, 144, 230, 409/231, 232, 233; 408/234, 239 R, 57, 59, 124; 29/57, 64

[56] References Cited

U.S. PATENT DOCUMENTS

| Re. 26,623 | 7/1969 | Erikson | 409/136 |
| 3,221,606 | 12/1965 | Baldwin | 409/135 |
| 3,490,333 | 1/1970 | Scruton | 409/233 |
| 3,568,566 | 3/1971 | Weidig | 409/233 |
| 4,303,360 | 12/1981 | Cayen et al. | 408/239 A |

FOREIGN PATENT DOCUMENTS

| 3024585 | 1/1982 | Fed. Rep. of Germany | 408/59 |
| 284519 | 7/1952 | Switzerland | 408/124 |
| 464450 | 7/1975 | U.S.S.R. | 408/59 |
| 643308 | 1/1979 | U.S.S.R. | 408/199 |

OTHER PUBLICATIONS

"High-Speed Milling Spindle", Type 817, Sep. 1983, by Henninger KG, 7541 Straubenhardt.
"Reliable+Quick+Plus Safe: Tool Chuck", Nov. 4, 1982 by Ott.

Primary Examiner—Gil Weidenfeld
Assistant Examiner—Daniel W. Howell
Attorney, Agent, or Firm—Flynn, Thiel, Boutell & Tanis

[57] ABSTRACT

A high-speed driving adapter for boring, milling and similar machine tools has a gear housing fixedly connected to a spindle housing of the machine tool. The gear housing rotatably supports a drive shaft having a taper shank disposed in a conical receiving bore in the machine tool spindle. A bearing sleeve is secured to the drive shaft and a tool-receiving spindle is rotatably supported therein and has a conical receiving bore coaxial with the drive shaft for the taper shank of a tool. A sun-and-planet gear arrangement is provided between the drive shaft and tool-receiving spindle. A collet carrier having a center ejecting pin and a collet is axially movable in a coaxial bore in the tool-receiving spindle, the collet having claws which engage an annular groove at an end of the tool taper shank. Several cup springs are arranged concentrically with respect to the collet carrier and urge the collet carrier away from the receiving bore. An arrangement to release the collet and eject the taper shank includes, in a coaxial bore in the drive shaft, a hydraulically actuated piston which can move the collet carrier against the urging of the cup springs.

6 Claims, 1 Drawing Figure

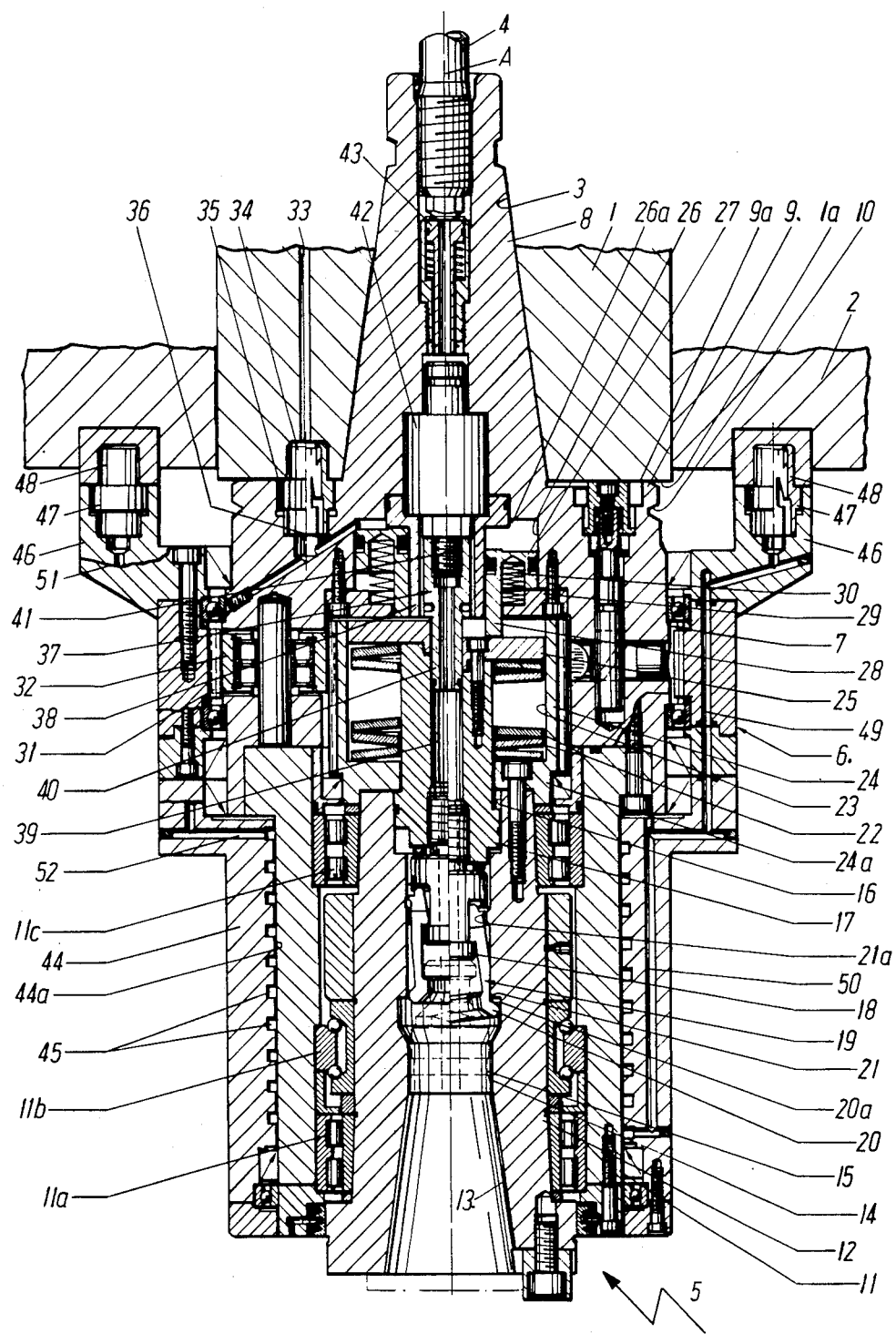

HIGH-SPEED DRIVING ADAPTER FOR BORING, MILLING AND SIMILAR MACHINE TOOLS

FIELD OF THE INVENTION

This invention relates to a high-speed driving adapter for boring, milling and similar machine tools and, more particularly, to an adapter which includes a gear housing which can be fixedly connected to the spindle housing of the machine tool, a drive shaft supported rotatably in the gear housing and having a taper shank which fits into a conical receiving bore of the machine tool spindle, a bearing sleeve which is secured to a front end of the drive shaft, a tool receiving spindle which is supported rotatably in said bearing sleeve and has a conical receiving bore for the taper shank of a boring or milling tool. The receiving bore being coaxial to the drive shaft, and a sun-and-planet gear arrangement which is provided between the drive shaft and the tool-receiving spindle, an outer gear of the sun-and-planet gear arrangement being connected to the gear housing, the sun gear therefor being connected to the tool-receiving spindle, and the planetary wheels thereof being supported on the drive shaft.

BACKGROUND OF THE INVENTION

In such a known high-speed driving adapter, also called a high-speed milling spindle (see the magazine published by the firm Henninger KG, 7541 Straubenhardt, "High-Speed Milling Spindle", Type 817, September 1983), the gear housing includes a flange having in an outer surface a groove for engagement by a gripping arm of a tool changer. Furthermore, a pin which projects in an axial direction is provided on the flange and, during attachement of the high-speed driving adapter, engages a corresponding bore in the spindle housing and in this manner ensures that the gear housing is fixed against rotation with respect to the spindle housing. High-speed driving adapters basically step up the speed of the machine tool spindle by a factor of three to six, so that the boring or milling tool which is inserted into the tool-receiving spindle of the high-speed driving adapter rotates at a higher speed than the machine tool spindle. This known high-speed driving adapter can be automatically connected to and disconnected from the machine tool spindle by means of an automatic tool changer, but it does not permit an automatic exchange of boring or milling tools which can be inserted into the tool-receiving spindle of the adapter.

Furthermore, a tool chuck which is designed for installation in a machine tool spindle is known (see German magazine published by the firm Ott, "Reliable + Quick + Safe; Tool chuck", Nov. 4, 1982). This chuck can chuck and release tool taper shanks in the conical receiving bore of the machine tool spindle. This known tool chuck has for this purpose a collet carrier which is movably supported in a center bore of the spindle and is provided with a center ejecting pin and a collet, the collet having claws which can engage an annular groove provided at the free end of a tool taper shank. A cup-spring package urges the collet carrier in an axial direction. At the rear end of the machine tool spindle is a cylinder with a hydraulically actuable piston movable therein, which piston can move the collet against the spring pressure so as to release the collet and eject the tool taper shank. In particular, through the separately mounted cylinder, the known tool chuck has a very long structural length in an axial direction, which makes it impossible to store the tool chuck in this form in the relatively small space of a high-speed driving adapter.

A basic purpose of the invention is to provide, in a high-speed driving adapter or boring, milling and similar machine tools of the above-mentioned type, a chucking releasing and ejecting device of the type typically arranged in machine tool spindles, in order to make possible an automatic chucking, releasing and ejecting of the boring or milling tools which can be inserted into the high-speed driving adapter, but without substantially increasing the dimensions of the high-speed driving adapter. Moreover, the stability of the high-speed driving adapter, particularly thermal stability, is supposed to be improved.

SUMMARY OF THE INVENTION

The objects and purposes of the invention are met by providing, in a device of the type to which the invention relates, a collet carrier which has a center ejecting pin and a collet which is axially movable in a coaxial bore of the tool-receiving spindle, the collet having claws which can engage an annular groove provided at the free end of the tool taper shank, several cup springs which are arranged concentrically with respect to the collet carrier and urge the collet carrier away from the receiving bore, and a hydraulically actuated piston which is provided in a coaxial bore of the drive shaft and can move the collet carrier against the spring pressure for releasing the collet and ejecting the tool taper shank.

Due to the fact that the collet carrier and collet are arranged in the tool-receiving spindle and the piston which serves to release the collet is arranged in a bore in the drive shaft, a particularly simple and compact design is achieved. The inventive high-speed driving adapter has an axial length which is equal to or at least not substantially greater than the axial length of a conventional high-speed driving adapter without an automatic chucking, releasing and ejecting device. By arranging the piston in the drive shaft, the pressure-medium supply to the piston becomes relatively simple, because it can occur directly from the machine tool spindle into the attached drive shaft. Since relative rotation between the machine tool spindle and drive shaft does not occur, the connection to the pressure-medium supply is relatively simple and can preferably occur through a known, self-closing plug connection.

An advantageous development of the invention involves the sun gear being hollow and concentrically surrounding the collet carrier, and the cup springs being arranged in the center cavity in the sun gear. Through this, particularly small dimensions in the axial direction are achieved.

Furthermore, it is advantageous if the bearing sleeve is surrounded by a cylinderical cooling coat which is connected to the gear housing and is supplied with cooling medium from the spindle housing. By means of this cooling coat and the cooling medium which is pumped through it, it is possible to discharge the heat which is created by bearing friction in the bearings between the tool-receiving spindle and bearing sleeve, so that heat expansion of the cooperating machine parts is reduced to a minimum, through which a high machining precision is achieved.

BRIEF DESCRIPTION OF THE DRAWING

The invention will be described in detail hereinafter in connection with one exemplary embodiment which is illustrated in the drawing.

The drawing is a longitudinal sectional side view of a high-speed driving adapter embodying the invention, the left half of the FIGURE showing the adapter in a chucked condition and the right half showing it in a non-chucked condition.

DETAILED DESCRIPTION

A machine tool spindle 1 of a boring, milling or similar machine tool of a large type is supported rotatably in a spindle housing 2. The machine tool spindle 1 has a conical receiving bore 3 therein and is provided with an axially movable draw rod 4, with which the taper shank of a tool or an attachment device can be drawn into the receiving bore 3 and can subsequently be released therefrom. The inventive high-speed driving adapter 5 is provided in this case as an attachment.

A drive shaft 7 is supported rotatably in a gear housing 6. The gear housing 6 can, as will be described in detail later, be connected to spindle housing 2 so as to be fixed against rotation with respect to housing 2. The drive shaft 7 has at its upper end a taper shaft 8 which fits into the conical receiving bore 3, advantageously a so-called stem cone. The taper shank 8 can be pulled into the receiving bore 3 and can be released therefrom by means of the draw rod 4. In order that the high-speed driving adapter can be inserted into the machine tool spindle 1 and can be released therefrom by means of a conventional automatic tool changer (not illustrated), the drive shaft 7 has aligned the foot of its taper shank 8 an axially extending flange 9 which has an annular groove 10 in its cylindrical outer surface. The gripping arrangement of the tool changer can engage the groove 10.

A bearing sleeve 11 is fixedly secured to the end of the drive shaft 7 which is remote from the taper shank 8. The tool-receiving spindle 12 is supported rotatably and coaxially with respect to the taper shank 8 within the bearing sleeve 11 by bearings 11a, 11b and 11c. The tool-receiving spindle 12 has a conical receiving bore 13 therein for receiving the tool taper shank 14 of a conventional boring or milling tool, which tool taper shank 14 is illustrated in dash-dotted lines. The tool taper shank 14 is provided with an annular groove 15 at its free end.

A collet carrier 17 is axially movably supported in a coaxial bore 16 in the tool-receiving spindle 12. The collet carrier 17 has at its lower end a center ejecting pin 18, on which is supported a collet which includes several collet levers 19. Each collet lever 19 has at its lower end a claw 20 which can engage the annular groove 15 of the tool taper shank 14. Furthermore, the claws 20 are provided with sloped surfaces 20a on their outside, which sloped surfaces 20a cooperate with an annular guiding edge 21 on the tool-receiving spindle 12. The annular guiding edge 21 controls the movement of the collet levers 19 during axial movement of the collet.

Furthermore, several cup springs 22 concentrically encircle the collet carrier 17, the spring pressure of the cup springs 22 urging the collet carrier 17 in a direction away from the receiving bore 13. The cup springs 22 are advantageously arranged in a cavity 23 provided in a sun gear 24 which in turn concentrically surrounds the collet carrier 17. The bottom 24a of the sun gear 24 is connected to the tool-receiving spindle 12. The cup-spring package 22 has one end supported on the bottom 24a of sun gear 24 and has its other end supported on a support plate 25 which is fixedly connected to the collet carrier 17.

A hydraulically actuated piston 27 is axially movably supported in a coaxial bore 26 in the drive shaft 7, which piston 27 is advantageously constructed as an annular piston. The piston 27 has a hollow piston rod 28 which cooperates with the support plate 25. A support ring 29 is connected to the drive shaft 7 and supports several return springs 30, which apply to the piston 27 a return force in a direction away from the collet carrier 17. The piston 27 is pressed back into its initial positon, which is illustrated in the left half of the drawing, by the return springs 30 when no overpressure exists in the pressure chamber 26a of the bore 26. The length of the hollow piston rod 28 is selected so that it does not engage the support plate 25 in the initial position of the piston 27.

A sun-planet gear arrangement is provided between the drive shaft 7 and the tool-receiving spindle 12 and translates the rotational speed of the machine tool spindle 1 into a higher speed, so that the tool-receiving spindle 12 rotates at three to six times the speed of the machine tool spindle 1. An annular outer gear 31 of the sun-and-planet gear arrangement is connected to the gear housing 6, but can alternatively be an integral part of the gear housing 6. Two or more planetary gear wheels 32 are rotatably supported on the drive shaft 7. The planetary wheels 32 mate with the outer gear 31 and the sun gear 24. The pressure-medium supply to the pressure chamber 26a occurs through a pressure-medium supply bore 33 in the machine tool spindle 1. The pressure-medium bore 33 is arranged in the present case eccentrically in the machine tool spindle 1, because a cooling and lubricating medium is fed to the tool through the center of the machine tool spindle. The pressure-medium bore 33 ends in a coupling part 34 of a commercial hydraulic plug connection, the other coupling part 35 of which is screwed into the flange 9 of the drive shaft 7. The coupling part 35 has an automatically operating closure mechanism which closes as soon as the plug connection is released. An included bore 36 connects the coupling part 35 to the pressure chamber 26a.

If no overpressure exists in the pressure chamber 26a, then the parts which cooperate with the collet carrier 17 assume the initial position which is illustrated in the left half of the drawing. In particular, the collet carrier 17 is pressed upwardly under the action of the strong cup spring 22, and the collet levers 19 engage the annular groove 15 and fixedly secure the tool taper shank 14 in the receiving bore 13. A small clearance exists between the lower end of the hollow piston rod 28a and the support plate 25. This clearance is needed because the support plate 25 and the tool-receiving spindle 12 rotate at three to six times the speed of the piston rod 28 which is supported in the drive shaft 7.

To release and eject the tool taper shank 14, the pressure chamber 26a is pressurized, which causes the piston 27 to move downwardly. Its piston rod 28 thereby engages the support plate 25 and presses the collet carrier 17 downwardly against the urging of the cut springs 22. The upper end of the collet levers 19 are thereby pressed radially inwardly by an annular guiding edge 21a, so that their claws 20 exit from the annular groove 15 and release the tool taper shank 14. Should the shank be jammed in the receiving bore 13, then further downward movment of the collet carrier 17 will cause the ejecting pin 18 to engage the upper end of the tool taper shank 14 and press it out of the receiving bore 13.

A cooling and lubricating medium must be supplied to the tool in some machining operations. In order to make this possible, a cooling and lubricating medium supply device 37 is provided in the center of the drive shaft 7 and is surrounded concentrically by a cylindrical sleeve 38 which extends into the bore 26. Between the cylinder sleeve 38 and the bore 26 is the annular pressure chamber 26a. The collet carrier 17 has a center bore 39, in which a pipe 40 is slidably, sealingly movable in a telescopic manner. The pipe 40 is screwed to a hollow pin 41, which is rotatably and sealingly supported in a cooling and lubricating medium supply housing 42. The cooling and lubricating medium is supplied to the housing 42 through the hollow draw rod 4 and a plug connection 43.

To increase the stiffness of the connection between the machine tool spindle 1 and the high-speed driving adapter 5, it is advantageous if the flange 9 has an annular support surface 9a which faces the machine tool spindle 1 and engages over the largest possible diameter a surface 1a on the machine tool spindle 1.

In order to maintain a high precision, it is furthermore advantageous to keep the difference between the temperature of the bearing sleeve 11 and room temperature, or another reference temperature, as small as possible. Namely, through friction in the bearings 11a, 11b and 11c, heat is created which can cause an expansion of the bearing sleeve 11 and thus a greater bearing clearance. In order to avoid this undesirable heating up of the bearing sleeve 11, and to thus maintain the operational precision of the high-speed driving adapter, the bearing sleeve 11 is advantageously surrounded by a cylindrical cooling coat or sleeve 44 which is connected to the gearing housing 6 and is supplied with a cooling medium from the spindle housing 2. The cooling medium coat 44 surrounds the bearing sleeve 11 with a small radial clearance and has on its inner surface 44a a helically extending cooling medium channel or groove 45 which opens toward the bearing sleeve 11.

The housing 6 is provided with two axially projecting shoulders 46 which extends toward the spindle housing 2, each of the shoulders 46 having therein a part 47 of a plug connection which cooperates with a further part 48 thereof supported in the spindle housing 2. A cooling medium, for example an oil-water emulsion, can be fed to the cooling medium channel 45 through one of the plug connections having parts 47 and 48 and through cooling medium supply bores 49 and 50 which are provided in the gear housing 6 and the cooling coat 44. The discharge of the heated cooling medium is effected through cooling medium discharge channels 51 and 52 and the other plug connection having parts 47 and 48.

The two plug connections 47 and 48 further more serve to connect the gear housing 6 to the spindle housing 2 so as to be fixed against rotation with respect thereto. Gear housing 6 thus cannot rotate about the machine tool spindle axis A in the operating position. The friction heat from the bearings 11a, 11b and 11c is thus discharged through the cooling medium which flows through the cooling medium channel 45 and thermal expansion of the bearing sleeve 11 and bearings 11a–11c is kept within narrow limits.

It would also be conceivable to use air as a cooling medium in place of the oil-water emulsion. In this case, it would then be advantageous to provide a plurality of cooling ribs on the outside of the cooling coat.

In place of the draw rod 4, it would also be possible to arrange in the machine tool spindle 1 a collet having levers which are similar to the collet levers 19 and can engage a corresponding annular groove in the taper shank 8.

If no inner supply of a cooling and lubricating medium is necessary, then it would also be conceivable to feed the pressure medium for the operation of the piston 27 centrally through the draw rod 4. In this case, the piston 27 would have to be constructed as a normal round piston and not as an annular piston.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a high-speed driving adapter for boring, milling and similar machine tools, including: a gear housing which can be connected to a spindle housing of the machine tool so as to be fixed against rotation with respect thereto; a drive shaft which is supported rotatably in said gear housing and has a taper shank which fits into a conical receiving bore of a machine tool spindle of the machine tool; a bearing sleeve which is secured to a front end of said drive shaft; a tool-receiving spindle which is supported rotatably in said bearing sleeve and has a conical receiving bore for said tool taper shank of a boring or milling tool, which receiving bore is coaxial with respect to said drive shaft; and a sun-and-planet gear arrangement which is provided between said drive shaft and said tool-receiving spindle, an outer gear of said sun-and-planet gear arrangement being connected to said gear housing a sun gear of said sun-and-planet gear arrangement being connected to said tool-receiving spindle, and planetary wheels of said sun-and-planet gear arrangement being rotatably supported on said drive shaft; the improvement comprising wherein said sun gear is hollow thereby defining a cavity and concentrically surrounds said collect carrier, wherein a collect carrier is provided with a center ejecting pin and a collet and is axially movably supported in a coaxial bore in the tool-receiving spindle, said collet having ends which are constructed as claws and can engage an annular groove provided at the free end of a tool taper shank; wherein a cup spring arrangement is arranged concentrically with respect to said collet carrier and in said cavity in said sun gear, said cup spring arrangement urging said collet carrier away from said receiving bore; and wherein means are provided for releasing said collet and ejecting a tool taper shank, including a hydraulically actuated piston which acts onto said collet carrier in a direction opposite to the spring pressure and which is provided in a coaxial bore in said drive shaft.

2. The high-speed driving adapted according to claim 1, wherein said cup spring arrangement has one end supported on a bottom portion of said cavity in said sun gear connected to said tool-receiving spindle, and has its other end supported on a support plate which is connected to an end of said collet carrier.

3. The high-speed driving adapter according to claim 1, wherein said piston is movable in the direction of said collet carrier against the urging of return springs supported on a support ring connected to said drive shaft.

4. The high-speed driving adapter according to claim 1, wherein a pressure medium supply to said bore of said drive shaft occurs through an automatically closing plug connection from a pressure medium bore in said machine tool spindle.

5. The high-speed driving adapter according to claim 1, wherein said collet carrier has a center bore in which a pipe is telescopically movable, said pipe being in turn connected to a hollow pin which is rotatably and sealingly supported in a cooling and lubricating medium supply housing arranged in said drive shaft.

6. The high-speed driving adapter according to claim 1, wherein said drive shaft has a flange at the end of its taper shank, said flange having an annular support surface which engages a surface on said machine tool spindle over the largest possible diameter.

* * * * *